United States Patent
Fisher et al.

(10) Patent No.: US 7,346,904 B2
(45) Date of Patent: Mar. 18, 2008

(54) SYSTEMS AND METHODS FOR PACKAGING FILES HAVING AUTOMATIC CONVERSION ACROSS PLATFORMS

(75) Inventors: Jeffrey O. Fisher, Austin, TX (US); Satish B. Reddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 10/637,015

(22) Filed: Aug. 7, 2003

(65) Prior Publication Data

US 2005/0034121 A1 Feb. 10, 2005

(51) Int. Cl.
*G06F 9/445* (2006.01)

(52) U.S. Cl. .................. 717/177; 717/175

(58) Field of Classification Search ........ 717/120–121, 717/136–138, 140–141, 171–177; 709/203
See application file for complete search history.

(56) References Cited

U.S. PATENT DOCUMENTS

| | | | | |
|---|---|---|---|---|
| 5,214,780 A | | 5/1993 | Ingoglia et al. | 395/600 |
| 5,504,846 A | * | 4/1996 | Fisher | 345/597 |
| 5,555,419 A | * | 9/1996 | Arsenault | 717/136 |
| 5,584,023 A | | 12/1996 | Hsu | 395/620 |
| 5,812,843 A | | 9/1998 | Yamazaki et al. | 395/670 |
| 5,920,733 A | | 7/1999 | Rao | 395/888 |
| 5,946,486 A | * | 8/1999 | Pekowski | 717/128 |
| 5,950,011 A | | 9/1999 | Albrecht et al. | 395/712 |
| 6,002,869 A | | 12/1999 | Hinckley | 395/704 |
| 6,079,047 A | | 6/2000 | Cotugno et al. | 714/807 |
| 6,144,969 A | * | 11/2000 | Inokuchi et al. | 707/200 |
| 6,253,234 B1 | * | 6/2001 | Hunt et al. | 709/213 |
| 6,279,124 B1 | | 8/2001 | Brouwer et al. | 714/38 |
| 6,286,041 B1 | * | 9/2001 | Collins et al. | 709/221 |

(Continued)

FOREIGN PATENT DOCUMENTS

JP 04-274535 9/1992

(Continued)

OTHER PUBLICATIONS

"Pre/Post Processor," *IBM Technical Disclosure Bulletin*, vol. 37, No. 04A, Apr. 1994, pp. 263-264.

(Continued)

*Primary Examiner*—Ted T. Vo
(74) *Attorney, Agent, or Firm*—Justin M. Dillon; Winstead PC

(57) ABSTRACT

A mechanism for sharing files, and sets of related files, or packages of files, in a multi-host, multi-platform environment is provided. A public package client handles user requests to perform operations on a software package. Additionally, information about the package and the files contained therein may be obtained. A server, responsive to the client, performs the operations on the package. Data about the files is set in a data structure which may be stored in an archive along with the files themselves. In particular, this data may identify each file as either a text or binary file and as an executable file. A client may access the aforementioned data to determine if the file or files require further processing to adapt the file to the operating system on the client. Such processing may, for example, include linefeed/carriage return translation and codepage translation, or setting file attributes.

3 Claims, 15 Drawing Sheets

U.S. PATENT DOCUMENTS

| | | | | |
|---|---|---|---|---|
| 6,675,382 B1* | 1/2004 | Foster | ............... | 717/177 |
| 6,775,819 B1* | 8/2004 | Hardikar et al. | ............... | 717/105 |
| 6,912,550 B2* | 6/2005 | Zhang et al. | ............... | 707/200 |
| 6,973,647 B2* | 12/2005 | Crudele et al. | ............... | 717/177 |
| 7,013,462 B2* | 3/2006 | Zara et al. | ............... | 717/177 |
| 7,092,974 B2* | 8/2006 | Thomas et al. | ............... | 707/203 |
| 7,131,123 B2* | 10/2006 | Suorsa et al. | ............... | 717/177 |
| 7,152,109 B2* | 12/2006 | Suorsa et al. | ............... | 709/226 |
| 2002/0059263 A1 | 5/2002 | Shima et al. | ............... | 707/100 |

FOREIGN PATENT DOCUMENTS

| | | |
|---|---|---|
| JP | 05-040721 | 2/1993 |
| JP | 2001-022715 | 1/2001 |

OTHER PUBLICATIONS

"Generic Code Page Conversion Application Program Interface," *IBM Technical Disclosure Bulletin*, vol. 34, No. 12, May 1992, pp. 421-430.

"Code Page Specification for Both Source and Destination File," *Research Disclosure*, Kenneth Mason Publications Ltd, England, Nov. 1990, No. 319, p. 1.

"Line Translation," via Internet at http://www.lugaru.com/man/Line+Translation.html, pp. 1-2.

"*Editing Files of Remote Systems Using An Integrated Development Environment*," Pending U.S. Appl. No. 10/285,996, filed Oct. 31, 2002, 49 pages.

"Transferring Data and Storing Metadata Across a Network," Pending U.S. Appl. No. 10/286,560, filed Oct. 31, 2002, 36 pages.

"Dynamic Generic Framework For Distributed Tooling," Pending U.S. Appl. No. 10/134,190, filed Apr. 29, 2002, 80 pages.

"Toggleable Widget For A User Interface," Pending U.S. Appl. No. 10/286,583, filed Oct. 31, 2002, 19 pages.

"Framework To Access A Remote System From An Integrated Development Environment," Pending U.S. Appl. No. 10/286,559, filed Oct. 31, 2002, 52 pages.

"Accessing A Remote Iseries Or AS/400 Computer System From An Integrated Development Environment," Pending U.S. Appl. No. 10/285,993, filed Oct. 31, 2002, 48 pages.

"Pre/Post Processer," *IBM Technical Disclosure Bulletin*, vol. 37, No. 04A, Apr. 1994, pp. 263-264.

"Line Translation," via Internet at http://www.lugaru.com/man/Line+Translation.html, pp. 1-2, Oct. 28, 2002.

\* cited by examiner

SYSTEMS AND METHODS FOR PACKAGING FILES HAVING AUTOMATIC CONVERSION ACROSS PLATFORMS

CROSS REFERENCE TO RELATED APPLICATIONS

The present invention is related to the following U.S. Patent Applications which are incorporated herein by reference, and filed concurrently herewith:

Ser. No. 10/636,988 entitled "Systems and Methods for Cooperatively Building Public Software Packages";

Ser. No. 10/637,067 entitled "Systems and Methods for a Bootstrap Mechanism for Software Testcase Execution"; and Ser. No. 10/636,985 entitled "Systems and Methods for Synchronizing Software Execution Across Data Processing Systems and Platforms."

TECHNICAL FIELD

The present invention relates to data processing system files, and in particular, to mechanisms for creation and management of software packages across operating systems (platforms).

BACKGROUND INFORMATION

Modern data processing systems in an enterprise environment typically are multi-platform systems. These also typically involve distributed file and application services across a network to provide resources to the multiple users which are connected to the resources via a network. The network may include a Local Area Network (LAN) a Wide Area Network (WAN) additionally, a large enterprise, these networks may additionally be connected via the Internet.

Software resources in this environment often include multiple files that may constitute executable files to provide some application service, associated documentation which may be in text or binary form and data required by the particular application. These applications may be available to the users to provide particular functionality required by the user or may provide administrative applications, or testcase software, as discussed in the commonly owned co-pending U.S. patent application Ser. No. 10/636,958 entitled "Systems and Methods for Synchronizing Software Execution Across Data Processing Systems and Platforms" hereby incorporated herein by reference. These files, in view of the distributed nature of the enterprise data processing environment may be packaged on one platform but may be used on another. (Methods and systems for automatically building such packages using the inventive principles discussed hereinbelow are described in the co-pending commonly-owned U.S. patent application Ser. No. 10/636,988 entitled "Systems and Methods for Building Public Software Packages," hereby incorporated herein by reference.) Thus, for example, a set of files to be shared and packaged, for example on a Unix or Unix-like operating system (such as Linux) may have attributes that are incompatible with a target platform, say Windows. Thus, text files, for example, created on the Unix platform may have embedded line breaks that are incompatible with the representation of line breaks on the target window's system (linefeeds on the Unix platform and a carriage return linefeed pair on Windows). Executable files packaged for sharing across an enterprise data processing system may also be problematic. For example, file extensions as used in a Windows environment are not meaningful on Unix, or Unix-like platforms. Thus, a binary executable in a package of files packaged in a Windows environment may not be recognized as an executable file in a Unix environment. Conversely, a shell script, which is a Unix executable would not be recognized as an executable file in a Windows environment, and such a file maintained in a Windows environment would not be flagged appropriately. Consequently, a package of files that is to be shared across multiple platforms may require, when moving from one platform to another, manual linefeed/carriage return translation (commonly referred to in the art as "CTRL+M" translation) and manual resetting of execution flags. These manual processes can be tedious, time consuming and error prone.

Consequently, there is a need in the art for mechanisms to automate the adaptation of shared file packages across platforms, and in particular text file linefeed/carriage return translation and file type flags in multi-user shared resource data processing systems.

Additionally, management of these filesets can be problematic. In such an environment, over time the number of archived packages of files may become unwieldy to manage and costly in terms of storage resources. However, because, particularly in a large enterprise, the number of users of a particular package of files may be unknown, or which particular users are using a set of files are difficult to determine or are otherwise unknown, the tendency is to maintain file archives indefinitely. Consequently, there is an additional need in the art for mechanisms to manage archived file packages, particularly with respect to the deletion and/or modification of such packages.

SUMMARY OF THE INVENTION

The aforementioned needs are addressed by the present invention. Accordingly, there is provided in one form, a method for creating and managing software packages. A request for creation of a software package in response to a user command is sent to a server. The request includes a data structure for containing package information. If the user command includes a file specification a file matching the file specification is sent in the request. Additionally, if the user command includes a file specification, a first file type identifier corresponding to a first type of said file sent in the request is set in an attribute file. The file type represents one of a binary file type and a text file type. Also, a second file type identifier corresponding to a second file type of the file is set in the attribute file. The second file type represents one of an executable file type and a nonexecutable file type. The attribute file is also sent in the request. The first and second type identifiers are operable for restoring file attribute flags associated with the file sent in the request.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
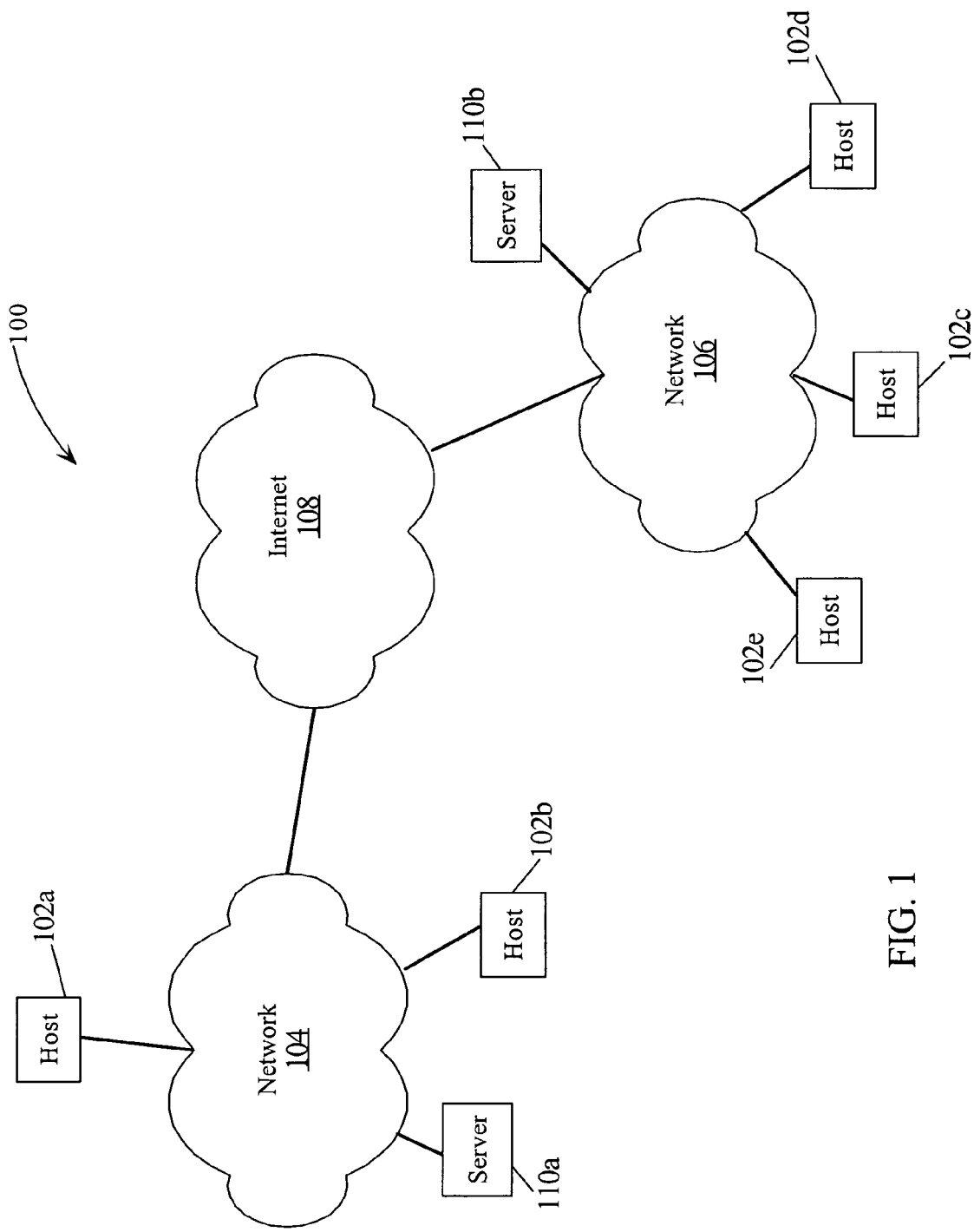
FIG. 1 illustrates, in block diagram form, a distributed resource data processing system which may be used in conjunction with the present inventive principles.

A mechanism in accordance with the present inventive principles for sharing files, and sets of related files, or packages of files, in a multi-host, multi-platform environment is provided. Note that for the purposes herein, the sets of related files may also be referred to as a file tree archive. A public package client handles user requests to perform operations on a software package. Operations may include package creation, file insertion and file deletion. Additionally, information about the package and the files contained therein may be obtained. A server, responsive to the client, performs the operations on the package. Data about the files is set in a data structure which may be stored in an archive along with the files themselves. In particular, this data may identify each file as either a text or binary file. Additionally, the data may identify a file as either an executable file or a non-executable file. Further data may identify the originating platform, that is, operating system. A host accessing the archived files via the client may access, in accordance with the present inventive principles, the aforementioned data to determine if the file or files require further processing to adapt the file to the operating system on the client. Such further processing may, for example, include linefeed/carriage return translation and codepage translation, or setting file attributes.

In the following description, numerous specific details are set forth to provide a thorough understanding of the present invention. For example, particular operating systems may be referred to, however, it would be recognized by those of ordinary skill in the art that the present invention may be practiced without such specific details, and, in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

FIG. 1 illustrates, schematically, a distributed data processing environment which may be used in conjunction with the present invention. System 100 includes a plurality of hosts, 102a-102e. Hosts 102a and 102b are depicted as connected to a network 104 which may be, for example, a local area network (LAN) or a wide area network (WAN). It would be appreciated by those of ordinary skill in the art that, typically, a number of hosts exceeding two would be connected to such a network, and hosts 102a and 102b connected to network 104 are exemplary. Similarly, hosts 102c-102e are connected to a network 106 which may also be a LAN or a WAN. Furthermore, networks 104 and 106 may be coupled via Internet work, now commonly referred to as the Internet 108. Servers 110a and 110b reside on networks 104 and 106, respectively. Again, it would be appreciated by those of ordinary skill in the art that in a typical distributed data processing environment, a plurality of servers may reside on each of the networks, and servers 110a and 110b are exemplary. Server 110a and 110b may provide file archiving and sharing services to the data processing system, and to the clients on the network, such as hosts 102a and 102b on network 104 and hosts 102c-102e on network 106. Additionally, the hosts on network 104 may obtain file archiving and sharing services from server 104b via the Internet 108. Likewise, hosts 102c-102e may obtain file archiving and sharing services from server 110a via Internet 108. In particular, these services may be provided by servers 110a and 110b in accordance with the present invention, as described further below.

Note that, in accordance with the present inventive principles, hosts 102a-102e need not deploy the same operating system, either among themselves, or with servers 110a and 110b. Additionally, the operating system deployed by server 110a need not be the same operating system deployed on server 110b. The file archiving and sharing services provided by servers 110a and 110b may include methodologies to effect the promulgation of packages, or file tree archives, across multiple hosts and multiple platforms in accordance with the principles of the present invention.

Figure 2:
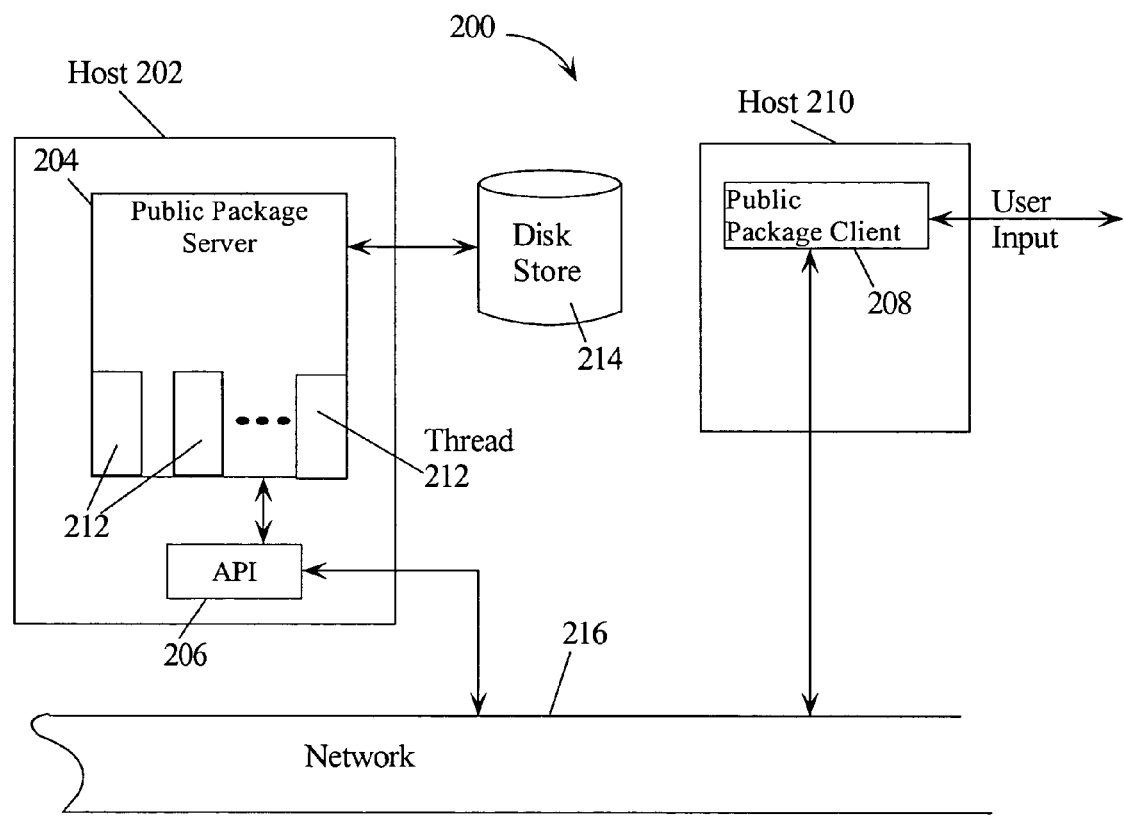
FIG. 2 illustrates, an architecture for software package management in accordance with the present inventive principles.

FIG. 2 illustrates an architecture 200 for a public software package management system (or facility) in accordance with the present inventive principles. Host 202 includes a public package server 204, and an associated application program interface (API) 206. Note that a host 202 may be used in an embodiment of servers 110a and 110b FIG. 1.

Public package server 204 services requests from a public package client 208, residing in host 210. A host 210 may be used in an embodiment of hosts 102a-e, FIG. 1. A user "creates" or performs other operations on a public package via client 208. Public package server 204 may be multi-threaded, each thread 212 handling a separate request. Packages may be stored in conventional storage devices such as archive store 214.

Commands may be sent to public package server 204 via network 216. As described below, communications between a client and a server may be via sockets supported by the TCP/IP protocol suite.

The operation of public package server 204 and client 208 will be described in conjunction with FIGS. 3-11, below.

Figure 3:
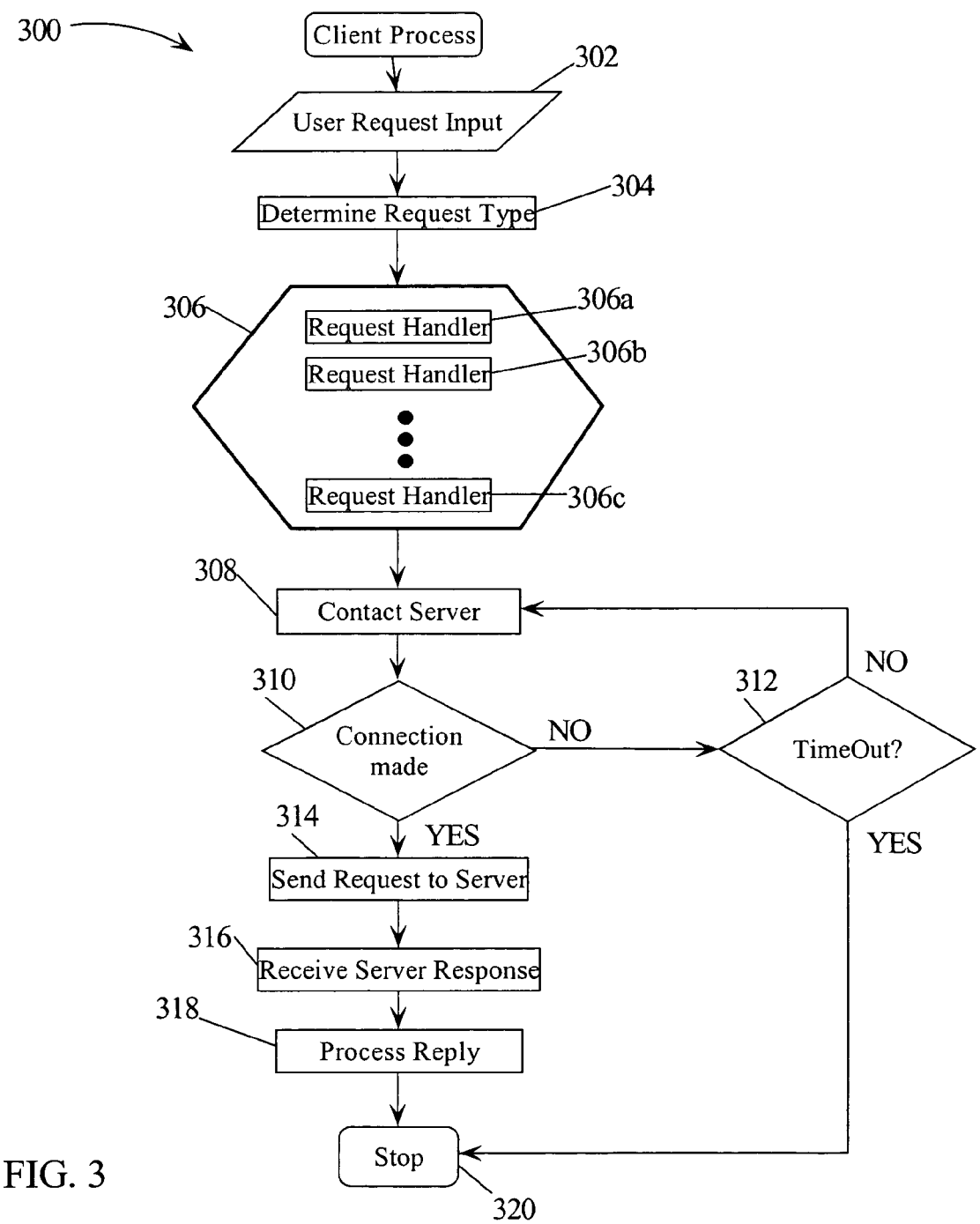
FIG. 3 illustrates, in flowchart form, a software package client process which may be used in conjunction with the architecture of FIG. 2.

Refer now to FIG. 3, illustrating in flowchart form, client process 300 in accordance with an embodiment of the present invention. Process 300 may represent a client process that may be executed for each request, the requirements of a particular request being performed by a set of request handlers invoked by the process. Note that the flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available to create and use public software packages. It is further noted that the order presented is illustrative and does not necessarily imply that the steps must be performed in the order shown.

In step 302, client process 300 receives user input requesting a public package operation, or service. User input may be in the form of a command-line command and associated parameters, typically in the form of a keyword and a value or list of values. From the user input, the type of request, that is, the operation requested, is determined, step 304, and in step 306, a request handler 306a-c is invoked. The type of request may be specified by a command-line keyword corresponding to request, for example, CREATE PUBPKG to create a software package, DELETE FILES to delete files from a software package (which may be specified by additional keyword-value pairs), DELETE PUBPKG, to delete an entire software package etc. It would be appreciated by persons of ordinary skill in the art that the aforementioned keywords are exemplary, and that other keywords may be used to represent the requested operations. Step 306 may be implemented as a multiway branch, or switch statement, for example. There may be a corresponding request handler for each action that may be performed on a software package. Operations that may be requested include a request to create a public package, to add files to an existing package, to delete files from an existing public package, to copy a public package from one server to another, to list files in a package, to extract some or all files from a package to a client, to query information about a package, etc. A request handler will be described in conjunction with FIGS. 4-6 below.

Process 300 contacts the public package server, step 308, and attempts a connection in step 310. If the connection is not made, the client continues to attempt to connect until a predetermined timeout elapses, step 312. A typical timeout value may be ten seconds. On establishing a connection, the request is sent to the server, step 314. As previously described in conjunction with FIG. 2, a request may be in the form of a packet sent via TCP/IP in an embodiment of the present invention. As described below in conjunction with FIGS. 7-9, the public software package server services the request and returns a response.

In step 316, client process receives the response from the server. In step 318, the reply is processed. A method for processing a reply is described below in conjunction with FIG. 7.

Process 300 terminates in step 320.

Figure 4:
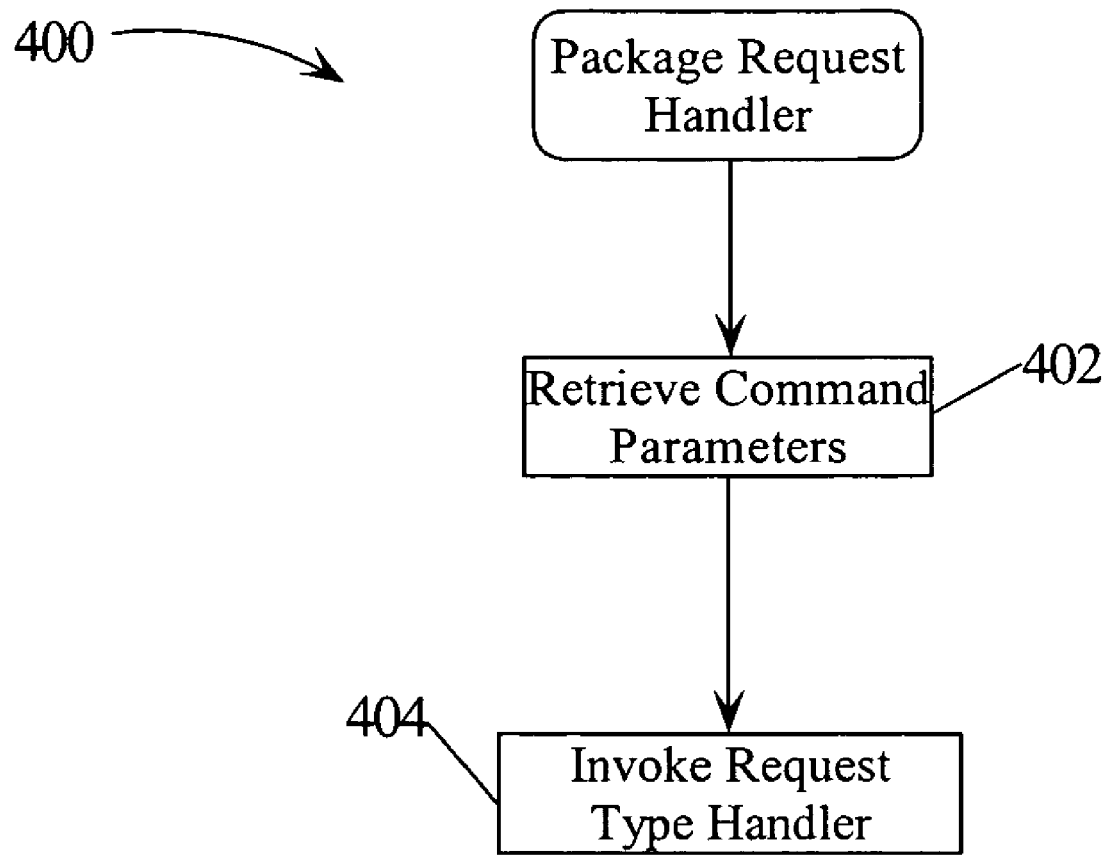
FIG. 4 illustrates, in flowchart form, a methodology for handling software package requests which may be used in conjunction with the client process of FIG. 3.

Referring now to FIG. 4, depicted therein is a process 400 for handling requests that maybe used in conjunction with step 306, FIG. 3. In step 402, the package data is retrieved from the command parameters. Recall, that the request may be command line parameters in the form of keywords or keyword-value pairs. (As previously noted, if a keyword represents a list, the "value" in the pair may be a list of values, which may be numerical values, strings etc. depending on the type of parameter the values represent. Such input data representations would be recognized by persons of ordinary skill in the programming art.) Input data may include, depending on the particular public package action requested, a public software package name, keywords associated with package management/access control, such as overwrite permission, passwords associated with the package (read and/or change), contact information, that is information that specifies a contact person for the package, or an autodelete lifetime (described below in conjunction with FIG. 7). Also, one or more (i.e. a list) of file specifications may be input in associated with a "FILES" keyword to specify files that are subject to the requested action, for example, insertion into or deletion from a package. Note that a file specification may include a pathname (full or partial, if a directory specification is included). Also a file specification may include wildcard characters and other metacharacters, as discussed further below. Additional keyword-value pairs that may be associated with a file specify file attributes, such as a text file, binary file, or a executable file. Note that for the purposes herein an executable file need not necessarily be a binary file. A script, such as a shell script, or a script written in a scripting language such as Perl, would be understood to be executable files. The foregoing is exemplary, and other sets of parameters may be used in alternative embodiments in accordance with the present inventive principles.

In step 404, a handler corresponding to the type of request is invoked.

Figure 5:
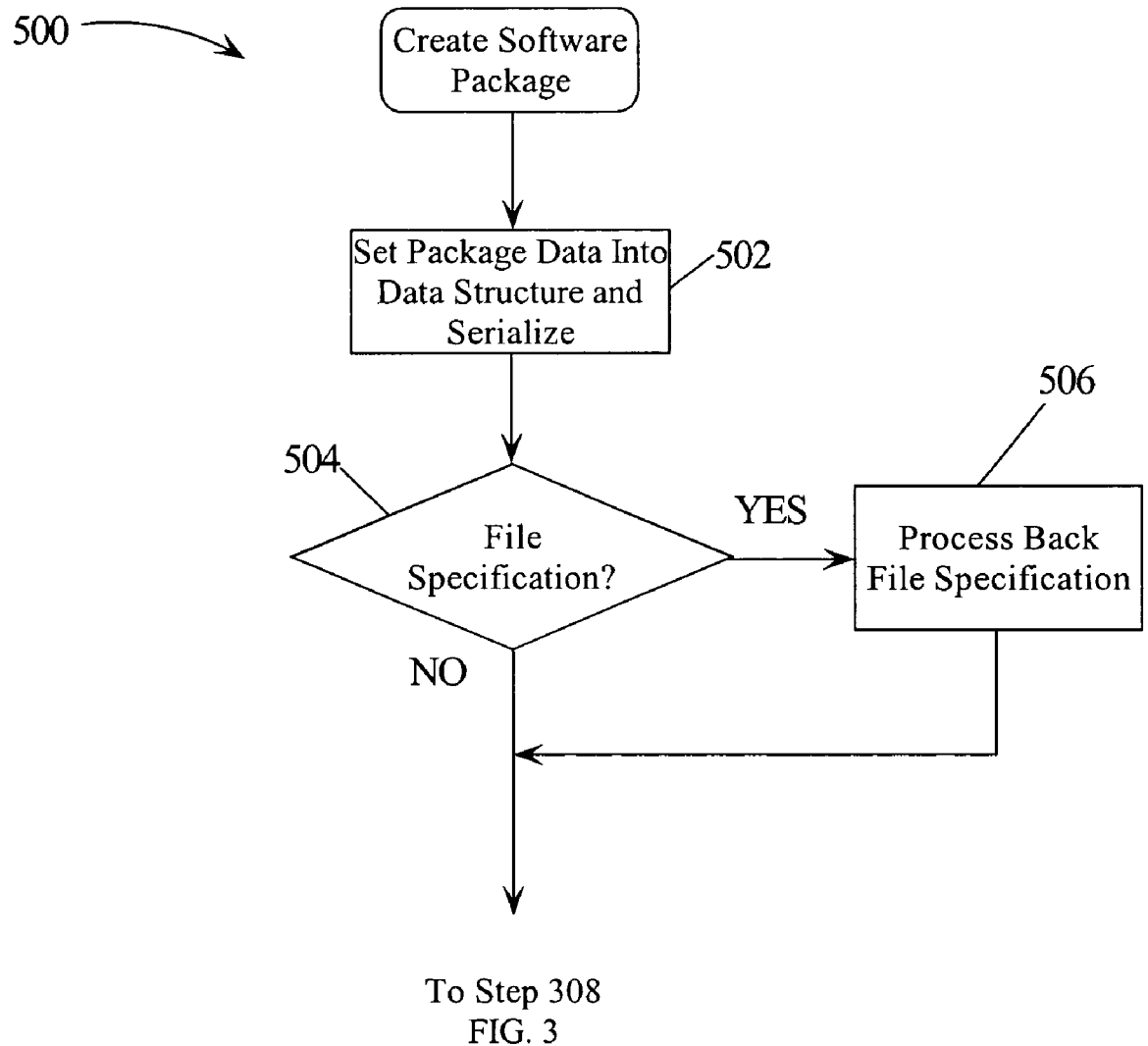
FIG. 5 illustrates, in flowchart form, a methodology for creating a public software package which may be used in conjunction with the methodology of FIG. 4.

Refer now to FIG. 5, illustrating a process 500 for creating a public package. Process 500 may be invoked in step 404, FIG. 4. In step 502, the package data is set into a data structure, which may be an object in an object-oriented programming model, such a Java, and the data structure is serialized. Serialization provides a mechanism for writing the complete state of the data structure to an output stream, such as a file or a socket (for sending over a network), and which allows for the data structure to be recreated by reading the serialized state. Typical modern high-level programming environments provide built-in mechanisms for serializing data structures. Java, for example, provides a writeObject( ) method and a readObject( ) method to serialize data structures (objects in Java) and de-serialize them, respectively. The package data includes the information retrieved from the request input parameters, for example in step 402, FIG. 4.

If the create request includes at least one file specification, the file specifications are processed, step 506 and process 500 proceeds to step 308, FIG. 3 to pass the create public package request including the file archive generated in processing the file specifications and the serialized package information (from step 502, FIG. 5) to the public package server. A method for processing the file specifications will be described in conjunction with FIG. 6.

If the request included no file specifications, step 506 is bypassed, and the create public package request is sent to the server as before, including the serialized public package information.

Figure 6:
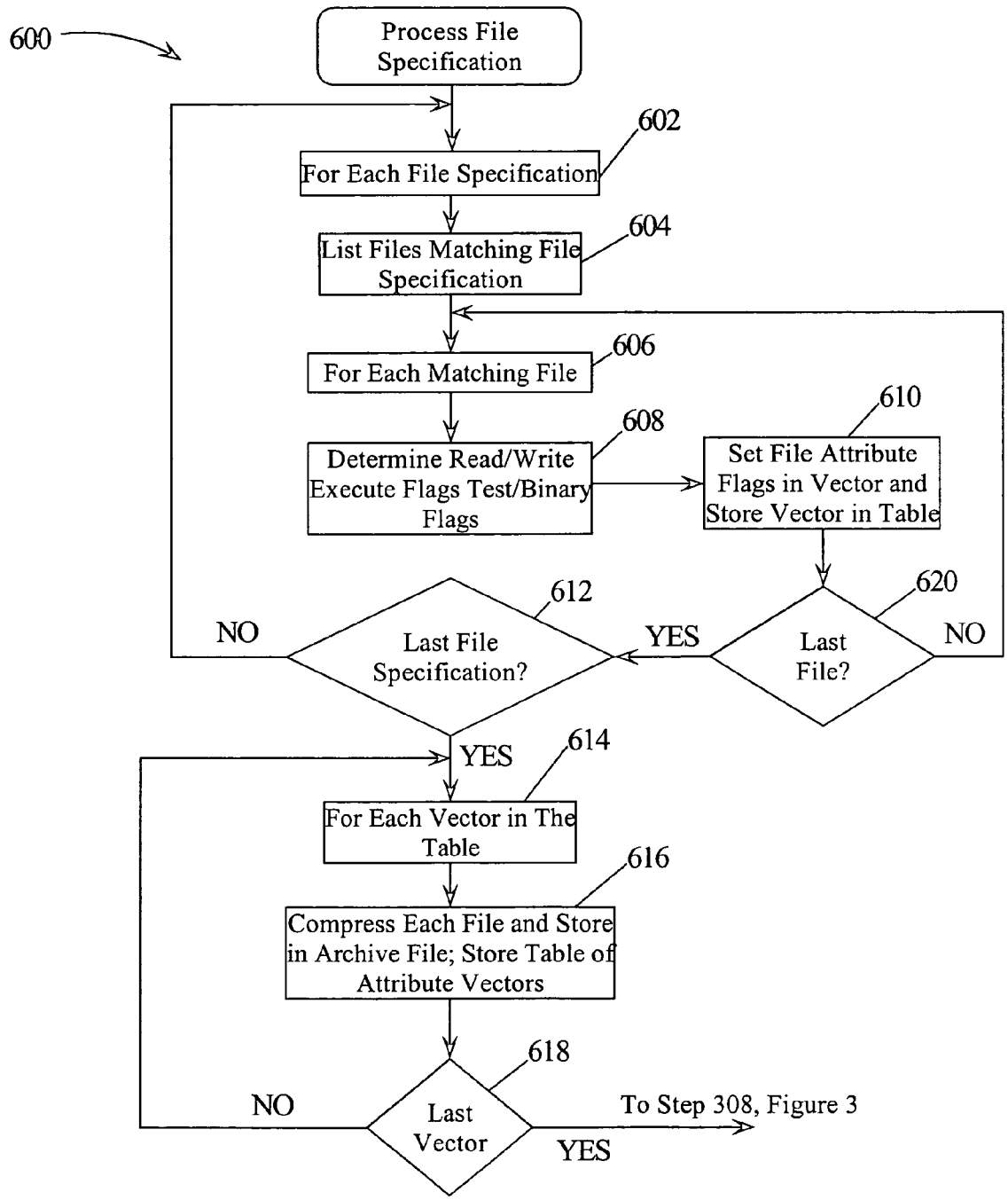
FIG. 6 illustrates, in flowchart form, a methodology for processing file specification which may be used in conjunction with the methodology of FIG. 5.

Refer now to FIG. 6 illustrating a method 600 for processing file specifications. As noted above, a file specification may be more general than simply a file name, or directory path and file name. A file specification may include "wildcard" characters or other metacharacters. In particular, a file specification may include regular expressions. (A regular expression is string comprised of a sequence of text and special characters that represents a pattern to be matched.) Unix and Unix-like platforms provide for regular expression based pattern matching as do programming languages such as Perl, Python and Java (in Java 2 Platform, Standard Edition, version 1.4). In this way, a file specification may be used to specify a set of files to be included in a software package. (Similarly, a set of files may be specified for deletion from a public package in a delete request.)

In step 602, a loop over the file specifications in the request is entered. In step 602, the files on the local host matching the current file specification are determined. In step 604, files matching the current file specification are listed. For each file, step 606, the read/write/executable and text/binary flags are determined in step 608. The file type may be determined by a postfixed extension such as .exe for executable files and .txt for text files in a Windows platform, or by examining the file type using a file command on Unix or Unix-like systems. Additionally, Java provides instance methods of the File class to determine file attributes, as do other high-level programming languages, as Perl and Python. Furthermore, in an embodiment of the present invention, keyword-value pairs may be defined to force a matching file to be tagged as a binary or text file. For example the keyword-value pair TEXT_FSPEC<textfspec> may be used to tag a file whose file specification matches textfspec to be tagged as a text file. Similarly, the keyword-value pair BINARY_FSPEC<binaryfspec> may be used to tag a file whose file specification matches binaryfspec to be tagged as a binary file. Defaults may also be defined, for example, if neither of these keyword-value pairs is used, a file may be tagged as a binary by default. Alternatively, keywords may be defined to set defaults. For example, a default to tag files as text, such as DEF_TO_TEXT, or default to tag as binary, such as DEF_TO_BINARY, may be used.

As discussed hereinbelow, these file attributes may be used to effect automatic linefeed and carriage return (LF/CR) translation and executable file tagging across platforms. In step 610, the file attributes determined in step 608 are set in a vector, which may be referred to as an attribute vector, associated with the current file. In an embodiment of the present invention, a vector may be an instance of the Java Vector class, which implements an array of objects. The objects need not be of the same type. Other programming languages, such as Python, implement similar data structures. For example, the vector may be an element of table storing each vector with the name of the corresponding file. However, any data structure may be used to contain the attributes for the files. This structure provides a temporary storage mechanism for the file attributes pending the storage of the files in a file archive for transmission to the package server. Steps 608 and 610 are repeated for each file matching the current file specification until process 600 breaks out of the loop over files, in step 612.

Process 600 continues to the next file specification, if any, via the "No" branch of step 614 and adds attribute vectors corresponding to files matching the next file specification. If there are no further file specifications, in step 614, the process exits the loop over file specifications entered in step 602. Thus, in steps 602-614 a data structure that represents a list of files matching the input file specifications and associated file attributes is generated.

In step 616, process 600 loops over the vectors in the table. In step 618, the corresponding file is compressed, and the attribute flags contained in the associated vector are stored in an archive file. That is, an attribute file containing tags representing read/write/execute and text/binary attributes of each file is included in the archive file. The attribute tags may be written into a text file, for example, each set of attributes with the associated file name. Alternatively, a file list and a hash table keyed by the corresponding file names may be used and serialized for incorporation into the archive file. Additionally, a codepage identifier may be inserted. As described further below, a codepage defines a mapping between text characters and an internal machine representation, typically a one or two byte value; codepages deployed on a platform may have a predetermined identified associated therewith. It would be appreciated by persons of ordinary skill in the art that the present inventive principles are not implicated by the particular mechanism used to store the file attributes. In an embodiment of the present invention, a ZIP archive file may be used. A ZIP archive file stores the files in a compressed form. However, uncompressed archives, such as TAR commonly available on Unix platforms may be used. Also a TAR archive may subsequently be compressed. GZIP, a compression process commonly available on Unix platforms may be used. Alternatively, a TAR archive may be compressed by creating a ZIP file of the TAR archive. The archive type may be specified by the user in a command-line parameter. The present inventive principles are not implicated by the particular compressed file archive mechanism used. It would be appreciated by those of ordinary skill in the art that using compressed archives may reduce network bandwidth demands in passing the create request to the software package server, in step 314, FIG. 3. The process breaks out of the loop over vectors in step 620 after all attribute vectors in the table have been stored along with the corresponding compressed files, and proceeds to step 308, FIG. 3.

Figure 7:
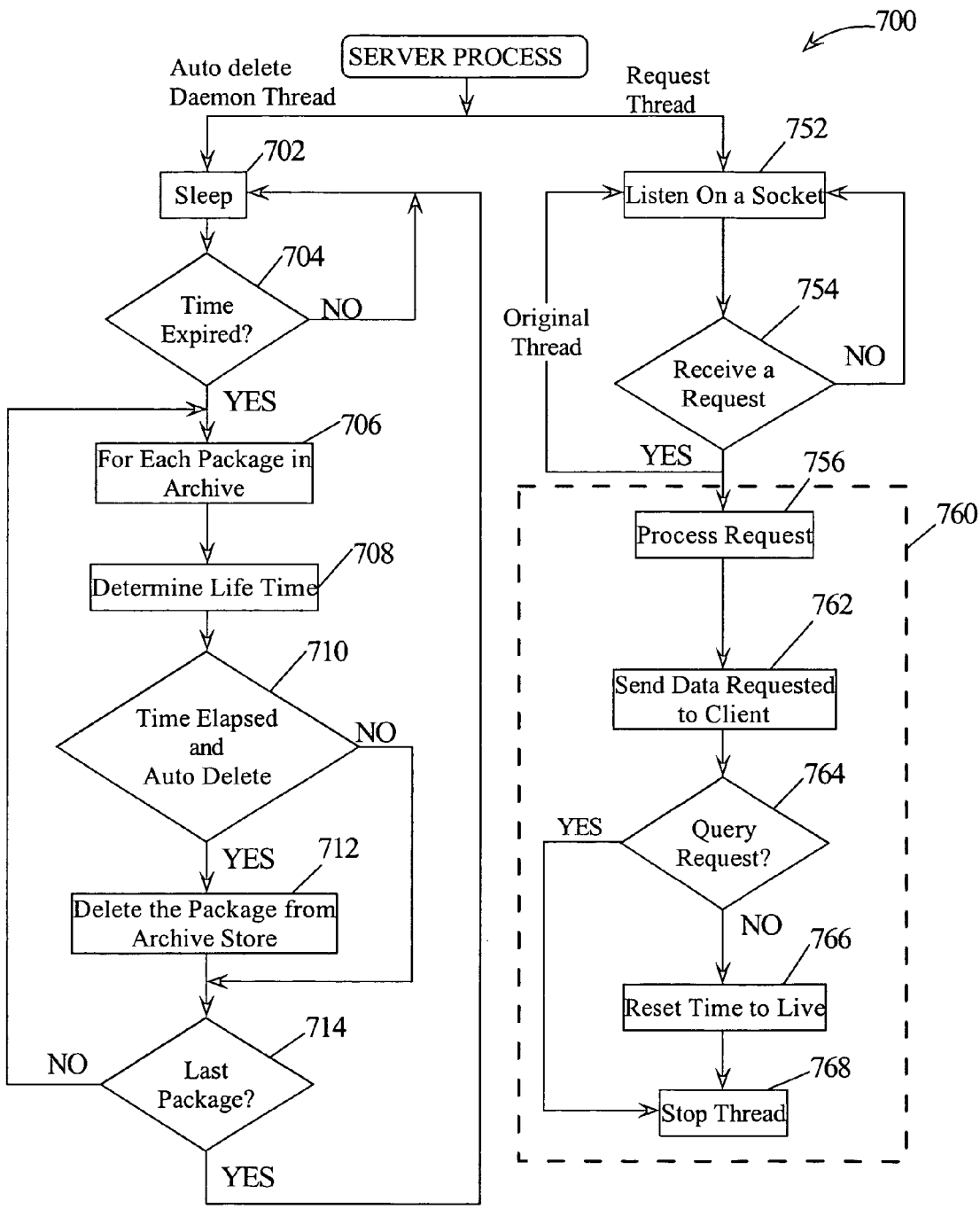
FIG. 7 illustrates, in flowchart form, a software package server process which may be used in conjunction with the architecture of FIG. 2.

Requests are handled by a public package server, as previously noted. A server process 700 for handling software package requests from clients is depicted in FIG. 7. Process 700 is a multithreaded process. In FIG. 7, two threads, an autodelete daemon thread, and a request handling thread are shown. As discussed hereinabove, a separate thread may be spawned by a server to handle each request.

Considering first the autodelete daemon, in step 702, the thread enters a loop in which the thread sleeps for a predetermined interval of time, one hour, for example. On expiration of the time interval, the thread "wakes up" in step 704, breaking out of the "sleep" loop. In this way, the autodelete daemon periodically loops through the archive store, such as archive store 214, FIG. 2, to delete software packages that have been specified for automatic deletion.

In step 706, the thread enters a loop over the software packages in the archive store. For each of the software packages, in step 708 the autodelete lifetime is determined. The autodelete lifetime may be determined by accessing the package information file provided by the client when the package was created, for example, in step 502, FIG. 5. As noted in conjunction therewith, the data may be accessed by deserializing the file and reading the autodelete value therefrom. In step 710 it is determined if the autodelete time has expired and an autodelete time has been specified. If the autodelete time has expired, in step 712, the package is deleted from the archive store, such as archive store. If the autodelete time has not expired, step 712 is bypassed. The thread returns to step 706, to loop over the packages in the archive store, repeating steps 708-712 for each package. After the last package has been tested, the thread returns to step 702, and sleeps until the next pass through the archive store.

Consider now the request thread. In step 752, the request thread listens on a socket for a request from a client to perform an operation on a specified package, looping until a request is received in step 754. A socket would be recognized by one of ordinary skill in the art as a logical representation of a communication endpoint in a data processing system. If a request is received, a thread 756 to process the request and return a reply to the requesting client is spawned. The original thread returns to step 752 to continue to listen for requests.

In step 760, thread 756 processes the request. A method for processing a request which may be used in conjunction with step 760 is described in connection with FIG. 8. If the request is not a query, in step 766, the lifetime for the package is reset. In step 764, if the request is a query, step 766 is bypassed. Thread 756 terminates in step 768.

Figure 8A:
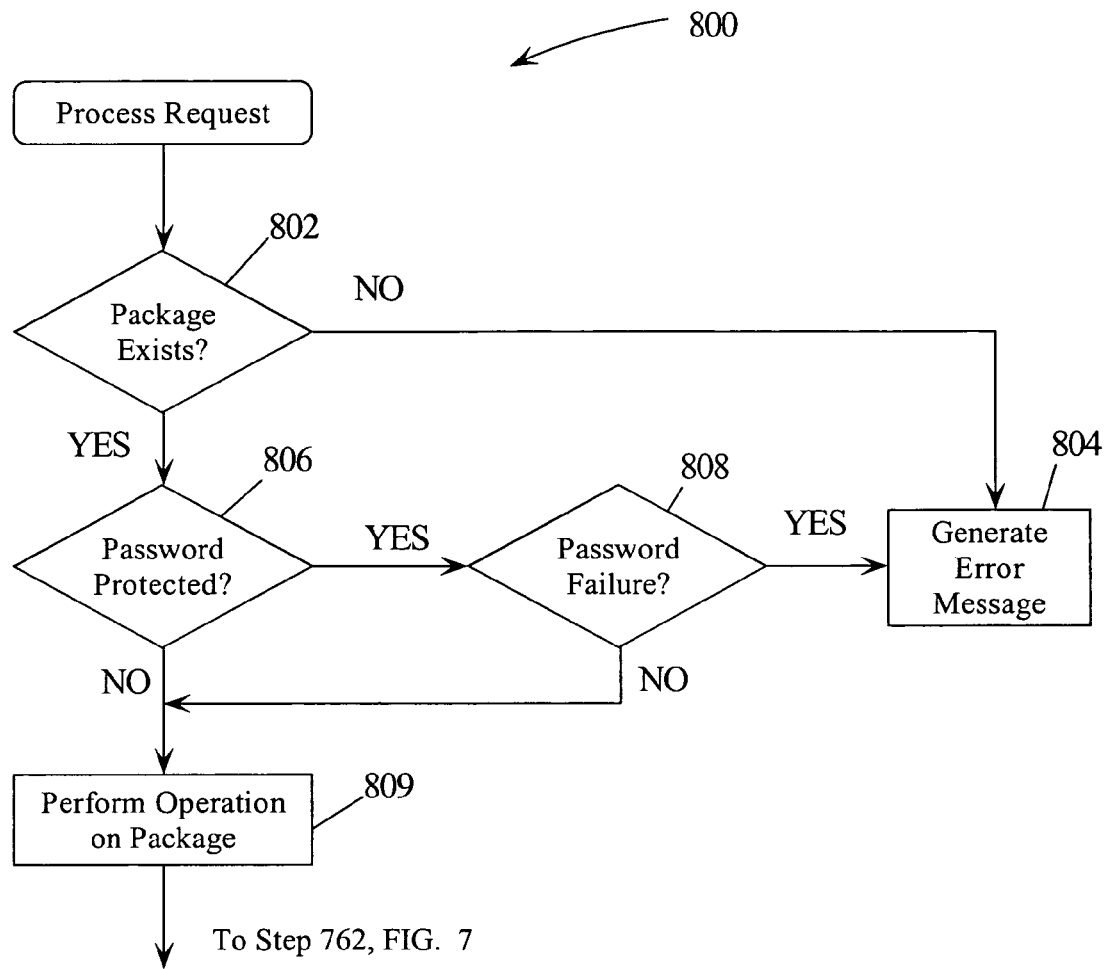
FIGS. 8A-8C illustrate, in flowchart form, a methodology for processing software package requests which may be used in conjunction with the methodology of FIG. 7.
Figure 8B:
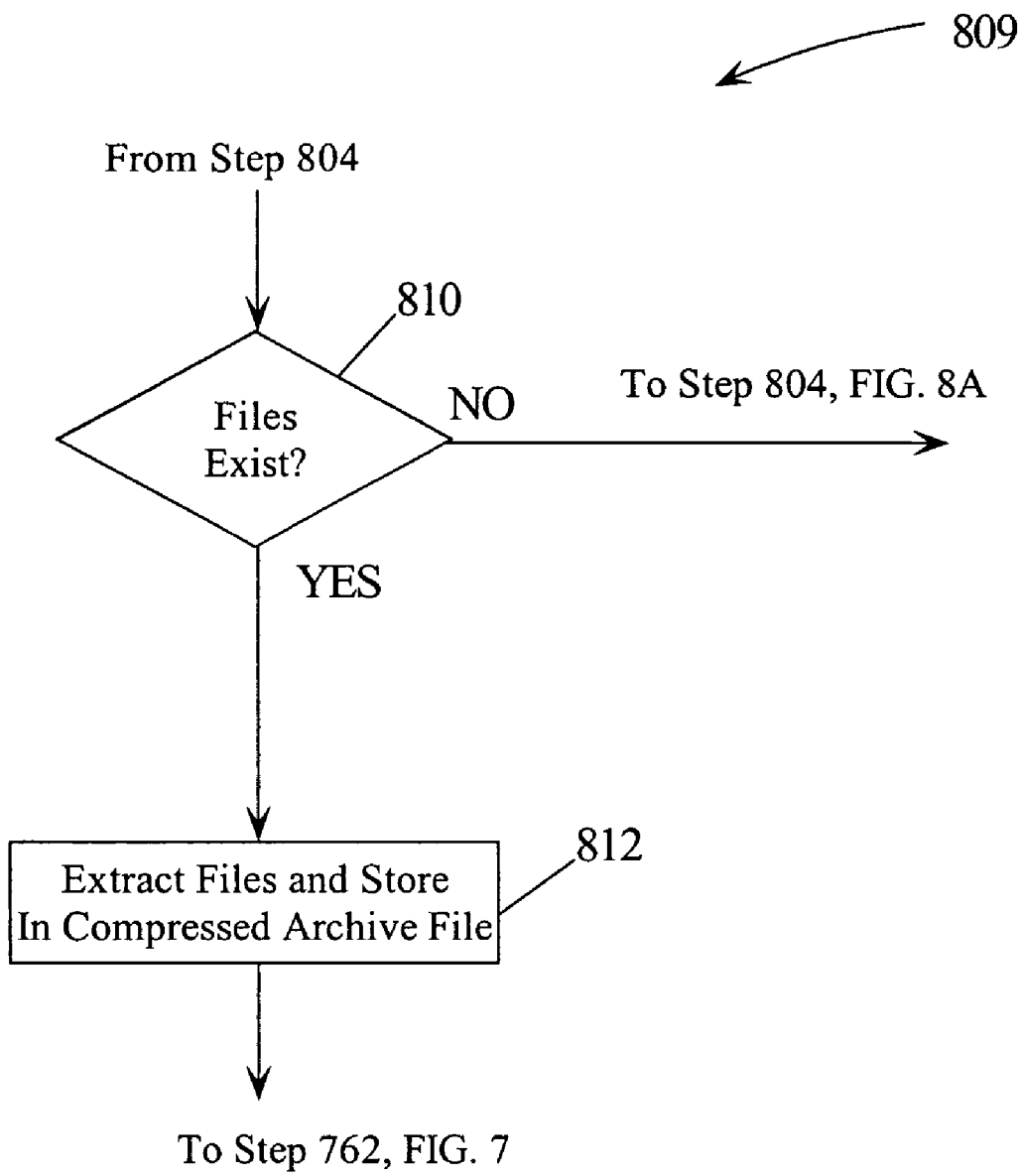

Refer now to FIGS. 8A and 8B illustrating a method 800 for processing software package requests by a package server. Method 800 may be used to perform step 760, FIG. 7.

In step 802, it is determined if the package specified in the request exists. If the package does not exist, a corresponding error message is generated, step 804, and returned to the requesting client via step 762, FIG. 7. If the package exists, in step 806 it is determined if the package is password protected. If the package is password protected, the password supplied in the request is matched against the password set in the package. If the password fails, step 808, because of a mismatch or no password was supplied in the request, a corresponding error message is generated in step 804, and returned to the client, as before.

If the package is not password protected, step 806, or the supplied password is correct, step 808, the requested package operation is performed, in step 809. Operations may include retrieving data form the package, copying a package to a host, retrieving information about a package, etc.

Consider FIG. 8B illustrating the substeps that may be performed by step 809 in response to a request to extract files from a package. In step 810, it is determined if the specified files exist. If so, the files are extracted from the package, step 812. The files may be stored in a compressed archive file, such as a ZIP file, to be returned to the client via step 762, FIG. 7. Additionally, the serialized package information object file (described in conjunction with step 502, FIG. 5) and the attribute file (described in conjunction with step 616, FIG. 6) are added to the archive file with the extracted files. If the files do not exist in step 810, an error message is generated, step 804, and returned to the client as before.

Figure 8C:
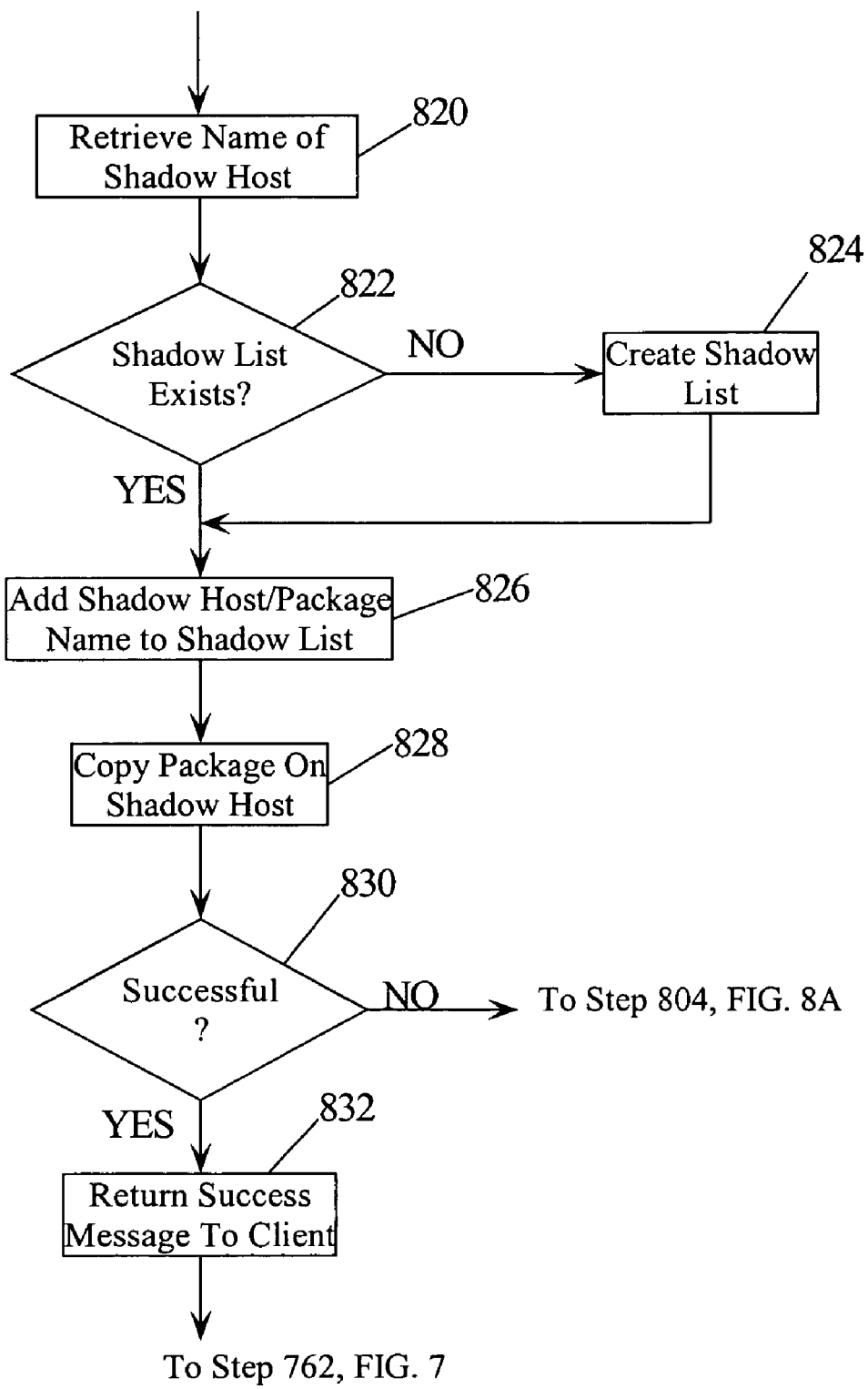

Another exemplary request may be to create a shadow of a package. If a shadowed package is changed by, for example, adding or deleting files, the changes may be passed to the shadow host, that is the host on which the shadowed package is copied. A method for creating a shadow package which may be used in conjunction with step 809, FIG. 8A is illustrated in FIG. 8C.

In step 820, the name of the shadow host is retrieved from the request received in step 754, FIG. 7. A public software package server may maintain a shadow list containing the names of any shadow hosts and the software packages shadowed thereon. Lists may be maintained for each package that is shadowed, that is, on a "per package" basis. The list may be used by the server to send updates with respect to shadowed packages to the respective shadow hosts. In step 822, it is determined if the list exists on the server servicing the request. If not, the list is created, step 824. If the list already exists, step 824 is bypassed. In step 826, the shadow host name and the public package being shadowed thereon is added to the list, and in step 828, the package is copied to the shadow host. If the copy failed, because, for example, a network connection to the shadow host could not be made, an error message is returned to the client via step 808, FIG. 8A and the "No" branch of step 830. If the shadow copy was successful, in step 832 a success message is returned to the client via the "Yes" branch of step 830.

Figure 9:
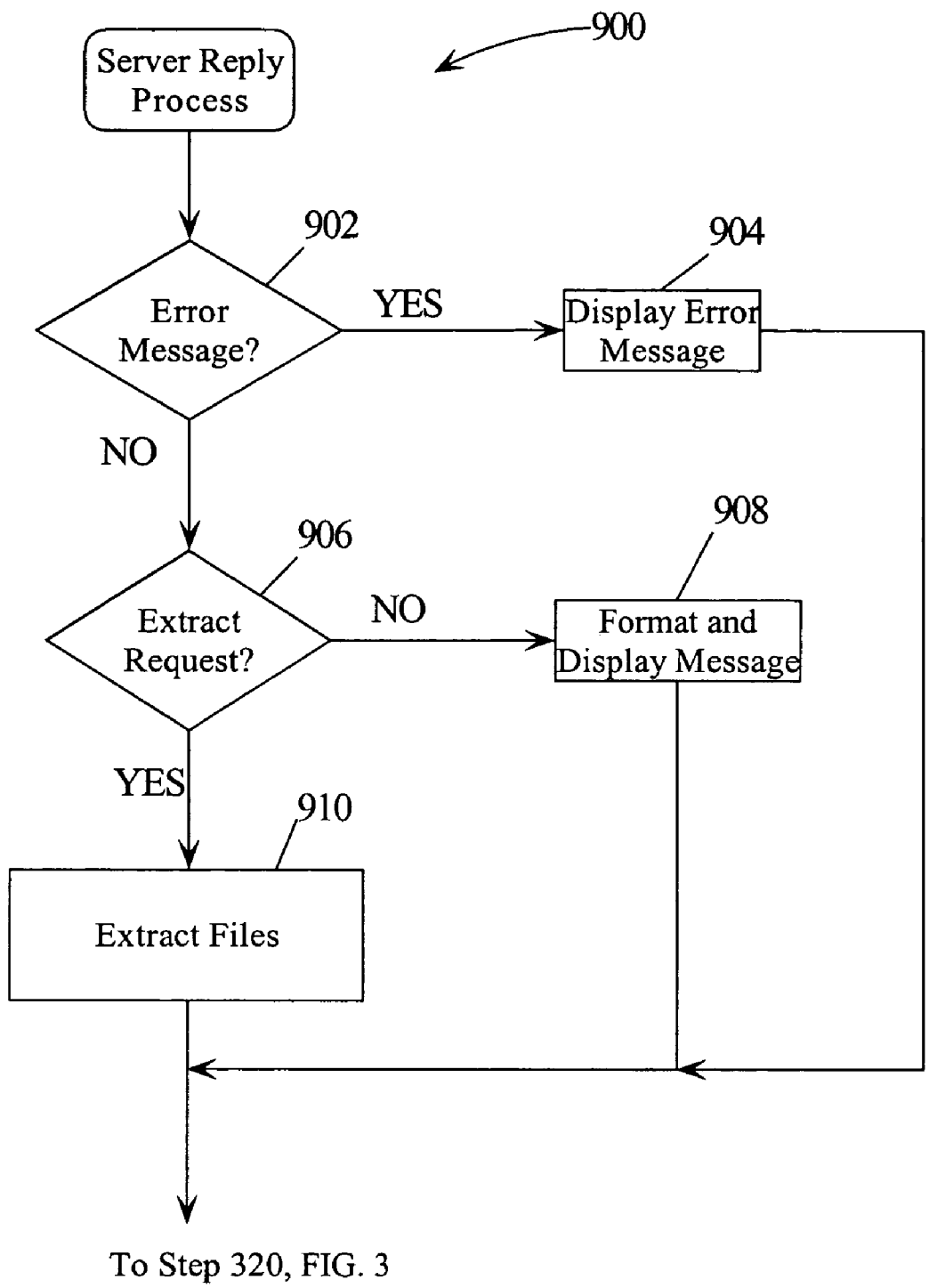
FIG. 9 illustrates, in flowchart form, a methodology for processing software package request replies which may be used in conjunction with the client process of FIG. 3.

As previously described in conjunction with FIG. 3, a client processes replies from a software package server. For example, client process 300 processes replies in step 318. A client method 900 for processing software package server replies is illustrated in FIG. 9. Process 900 may be used to perform step 318, FIG. 3.

In step 902, it is determined if the reply is an error message. If so, the message is displayed in step 904. For example, the server may return an error code and text message to the client, which displays at the command line. The text may provide a brief description of the nature of the error. Thus, if a package name was specified in a request, and the package (specified by a path/packguard) is not found, that is, does not exist, an error message PUBPRG_ERR_PUBPKG_DOES_NOT_EXIST may be returned, and displayed. This would inform the user that the requested package (or path) did not exist. Similarly, if the syntax of a request is improper, for example the request included an undefined keyword, an error message such as PUBPKG_GRR_SYNTAX_KEYWORD may be returned and displayed.

If the request for which the reply being processed was an extract request, the reply contains the specified files, as described in conjunction with steps 810 and 812, FIG. 8B. In step 906, it is determined if the reply is in response to an extract request. If not, the reply is a message that is formatted and displayed in step 908. For example, a request may be for a list of files contained in a specific package, wherein the returned message may be a text message containing the list of files, similar to a list of files generated by a shell command for listing files in a file system directory, such as the ls command in a Unix or Linux platform. As previously noted, the server and client may communicate via sockets and a message may be passed by writing to the socket and reading from the socket; sockets are typically supported by the TCP/IP protocol suite.

If the reply is returned in response to an extract request, in step 910, the files are decompressed, and the read/write/execute flags and text/binary flags are retrieved, and file attributes are set and CR/LF translation is performed. Process 900 proceeds to step 320, FIG. 3. In an alternative embodiment, described below, codepage translation may be performed in step 910.

Figure 10A:
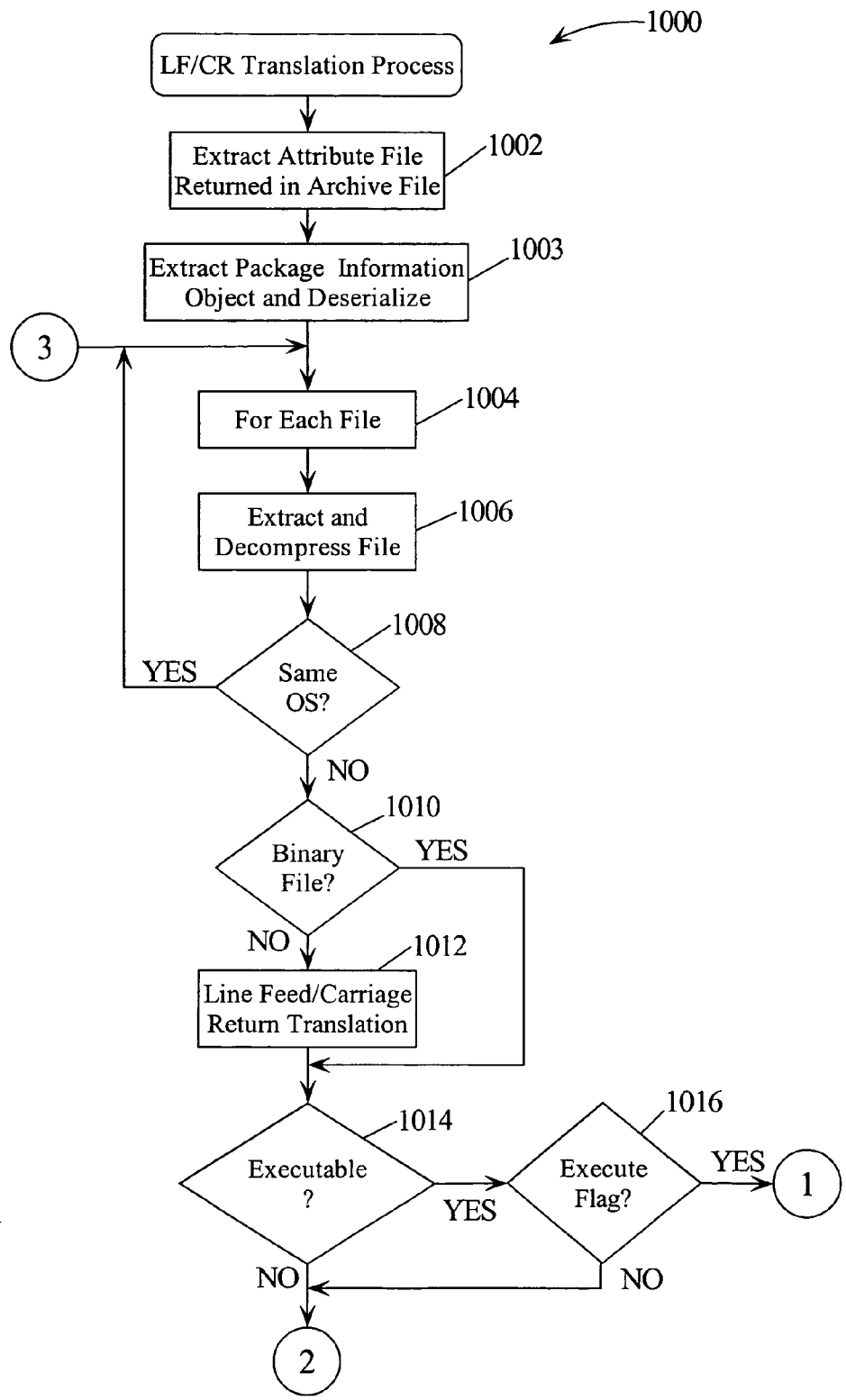
FIGS. 10A-10B illustrate, in flowchart form, a methodology for restoring file attributes and CR/LF transformations across platforms which may be used in conjunction with the methodology of FIG. 9.
Figure 10B:
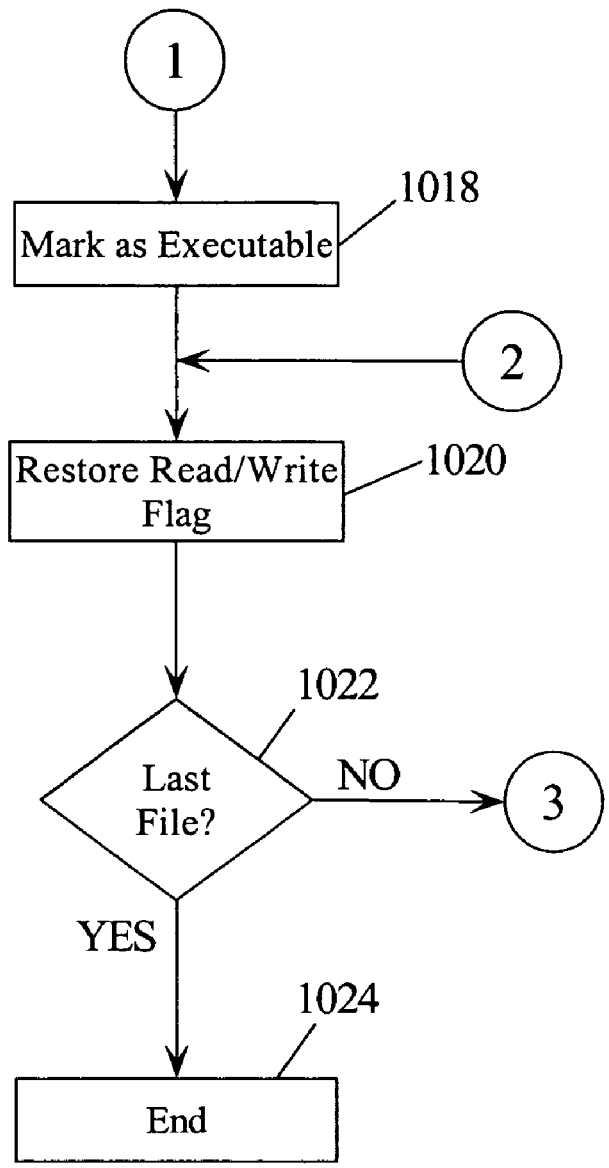

Refer now to FIG. 10 illustrating a methodology for performing CR/LF translation and restoring file attributes based on the source and target platforms in accordance with an embodiment of the present invention.

In steps 1002 and 1003 file and package information is retrieved. In step 1002, the attribute file described above in conjunction with step 616, FIG. 6, is extracted from the archive, such as a ZIP archive. In step 1003, the serialized package information object file is extracted and deserialized. Recall that deserializing the file reconstructs the underlying object (or other data structure), the members of which include the package information data, such as the originating operating system.

In step 1004, a loop is entered over each of files extracted from the package and returned by the server. In step 1006, the file is extracted from the returned archive, and expanded. Because, as discussed hereinabove, the files may have been created on a different operating system, or platform, than the operating system of the local host on which the unpackaging process is executing, file translation and flagging may be required. In step 1008, it is determined if the target operating system is the same as the originating operating system. This may be performed using the originating operating system identifier in the package information object, reconstructed in step 1003.

If the operating systems are different, in step 1010 it is determined if the current file is a binary file. This may be determined by examining the text/binary attribute in the attribute file extracted in step 1002. If the file is not a binary file, in step 1012, line feed/carriage return translation is performed. Recall that executable files may include shell scripts, for example. Although these are executable files, they are composed of text. Thus, for example, if the originating operating system is a windows platform and the target operating system is a Unix platform, or a Unix-like platform, such as Linux, in step 1012, carriage returns would be deleted from the carriage return/line feed pairs used in windows to denote line breaks in text files. A technique which may be used in an embodiment of the present invention to perform step 1012 may be regular expression substitution. As previously noted, facilities for performing regular express matching and substitution are available on Unix and Unix-like platforms and several programming environments, including Java and Perl. It would be appreciated by those of ordinary skill in the art that alternative techniques may be used to effect the line feed/carriage return translations and such embodiments would fall into the spirit and scope of the present invention. If, in step 1010, the current file is a binary file step 1012 is bypassed.

In step 1014 it is determined if the current file is executable. If, in step 1016, the current operating system has an executable flag (a Unix-like system, for example) the file is marked as executable in step 1018.

Returning to step 1014, if the file is not executable, steps 1016 and 1018 are bypassed.

In step 1020, the file's read/write flag is restored. If the current file is not the last file in the package, step 1022, process 1000 returns to step 1004 to continue to loop over files in the package. Otherwise, process 1000 terminates in step 1024.

Returning to step 1008, if the originating and target operating systems are the same, process 1000 bypasses the linefeed translation operation, and proceeds to step 1014 to restore the read/write flag and the executable flag (on Unix-like systems) as previously described.

Figure 11:
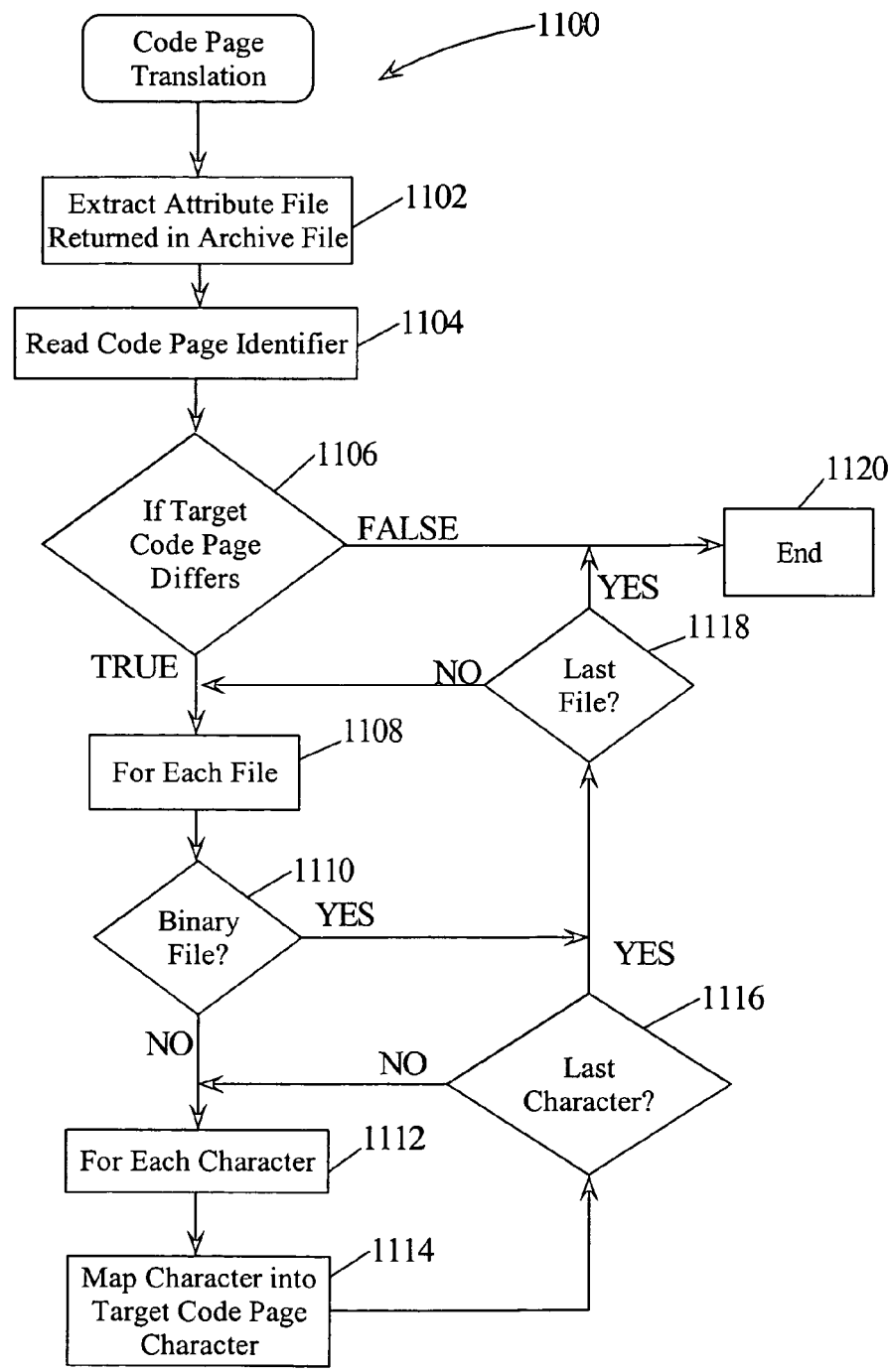
FIG. 11 illustrates, in flowchart form, a methodology for codepage translation in accordance with an embodiment of the present invention.

As previously described above, in an alternative embodiment, in step 910, FIG. 9, codepage translation may be performed. As would be appreciated by those of ordinary skill in the art, data processing systems internally represent text characters as a set of "numerical" values, typically one or two bytes long. A codepage defines the mapping between the integer values and the characters represented. Two codepages that are widely used to define the mapping for the English alphabet are the eight-bit ASCII (American Standard Code for Information Exchange) character codes, commonly used on personal computers and workstations, and EBCDIC (Extended Binary Coded Decimal Interchange Code) character codes which has typically been used on mainframe computers. Additionally codepages have been defined to represent the alphabets of other languages. A "universal" codepage, referred to as Unicode, defines a sixteen-bit representation that includes characters represent most if not all of the languages used around the world. Given two codepages, a mapping between the two may be defined as array in which the first character code provides an index in to the array and the encoding in accordance with the second codepage represented by the values. By associating an identifier with each codepage, a text file encoded using one codepage may be translated into a text file encoded in accordance with a second codepage via the mapping. Commonly used codepages have been assigned identifier by industry practice, or by standards-settings bodies. For example, in the Microsoft® Windows operating system the ASCII codepage is designated by the identifier "1252" and the ISO (International Organization for Standardization) Latin-1 codepage may be identified as "8859-1" (ISO Latin-1 includes the characters used in most Western European languages and is the default character set used in HTML.) It would be understood by one of ordinary skill in the art that the present inventive principles are not implicated by the particular identifiers used to identify codepages, and any predetermined set of identifiers may be used in conjunction with the present invention. FIG. 11, described below, depicts, in flowchart form, a process 1100 for performing codepage translation in accordance with the present invention.

Referring to FIG. 11, in step 1102 the attribute file described above in conjunction with step 616, FIG. 6, is extracted from the archive, such as a ZIP archive. In step 1104, a codepage identifier for the codepage defining the encoding of text files in the package is read. If the codepage on the target platform differs from the codepage used to encode the text files, step 1106, codepage translation is performed via steps 1108-1118. Otherwise, no codepage translation is performed, and process 1100 terminates in step 1120.

In step 1108 a loop over files in the package is entered. In step 1110 it is determined if a current file is a binary file. If not, in steps 1112 codepage translation is performed on the file by looping over the characters in the file, step 1112, and mapping each character into the corresponding character in the target codepage, step 1114. The mapping may be performed using the translation table, discussed above, for the encoding and target code tables.

After the last character is mapped, step 1116, in step 1118 it is determined of the current file is the last file in the package. If so, process 1100 terminates in step 1120. Otherwise, process 1200 continues to loop over files by returning to step 1108.

Returning to step 1116, if the current file is a binary file, no translation is performed, and process 1100 proceeds to step 1118 to determine if the last file has been translated (if needed). If so, process 1200 terminates in step 1120. Otherwise, process 1200 continues to loop over files as previously described.

Figure 12:
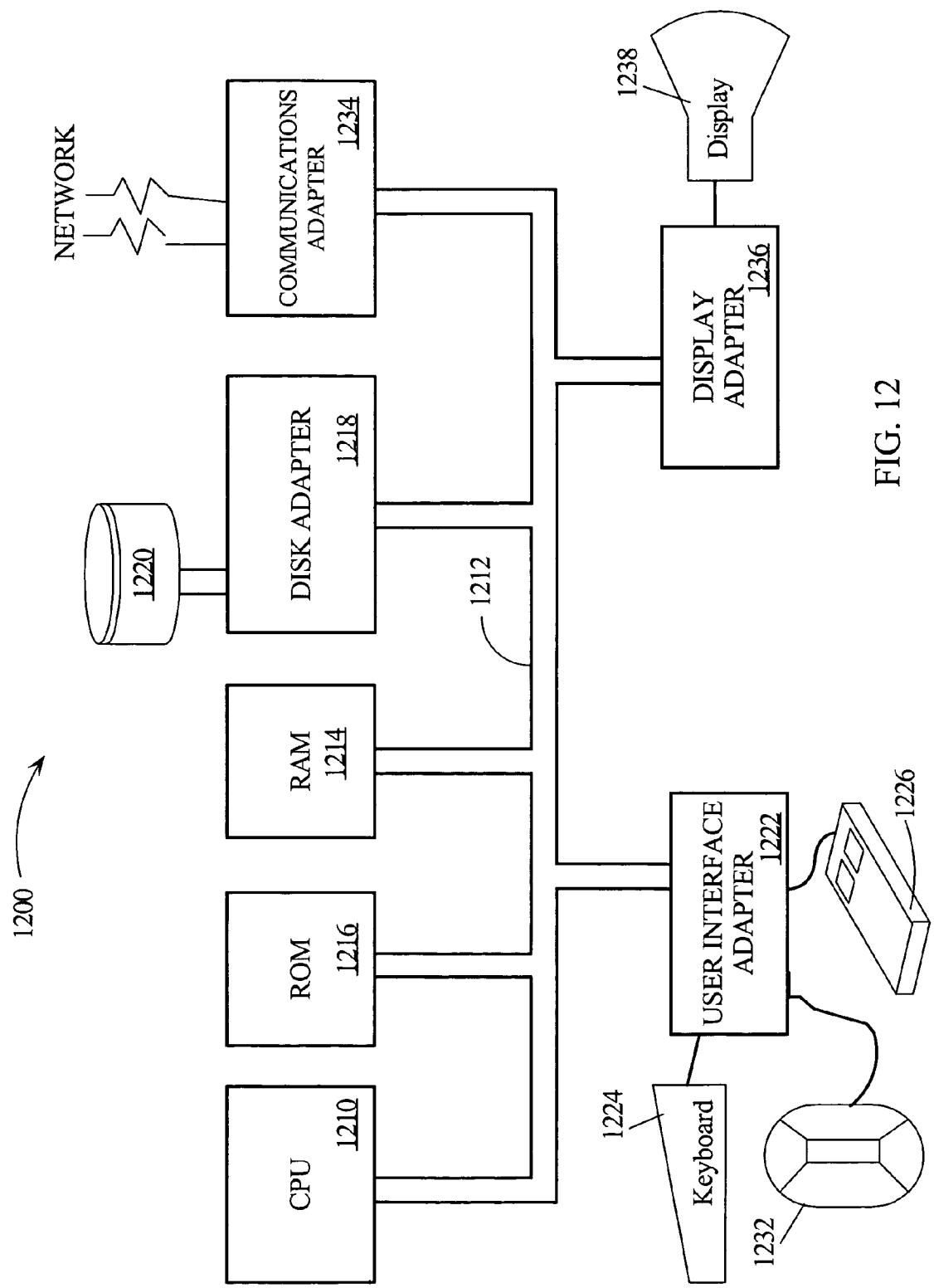
FIG. 12 illustrates, in block diagram form, a data processing system which may be used in conjunction with the methodologies incorporating the present inventive principles.

FIG. 12 illustrates an exemplary hardware configuration of data processing system 1100 in accordance with the subject invention. The system in conjunction with the methodologies illustrated in FIGS. 3-6, 9-11 may be used, in one embodiment, to perform software package client operations in accordance with the present inventive principles. In another embodiment, the system in conjunction with the methodologies in FIGS. 7 and 8A-8C may be used to perform software package server operations in accordance with the present invention. Data processing system 1200 includes central processing unit (CPU) 1210, such as a conventional microprocessor, and a number of other units interconnected via system bus 1212. Data processing system 1200 also includes random access memory (RAM) 1214, read only memory (ROM) 1216 and input/output (I/O) adapter 1218 for connecting peripheral devices such as disk units 1220 to bus 1212, user interface adapter 1222 for connecting keyboard 1214, mouse 1226, trackball 1232 and/or other user interface devices such as a touch screen device (not shown) to bus 1212. System 1200 also includes communication adapter 1234 for connecting data processing system 1200 to a data processing network, enabling the system to communicate with other systems, and display adapter 1236 for connecting bus 1212 to display device 1238. CPU 1210 may include other circuitry not shown herein, which will include circuitry commonly found within a microprocessor, e.g. execution units, bus interface units, arithmetic logic units, etc. CPU 1210 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 1214 of one or more computer systems configured generally as described above. These sets of instructions, in conjunction with system components that execute them may in one embodiment perform software package server operations and, in another embodiment perform public package client operations, as described hereinabove. Until required by the computer system, the set of instructions may be stored as a computer program product in another computer memory, for example, in disk drive 1220 (which may include a removable memory such as an optical disk or floppy disk for eventual use in the disk drive 1220). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for creating and managing software packages comprising:
   (a) sending a request for creation of a software package in response to a user command, said request including a data structure for containing package information;
   (b) if said user command includes a file specification:
      (i) sending a file matching said file specification in said request;
      (ii) setting a first file tag corresponding to a first type of said file in step (i) in an attribute file, wherein said first file type represents one of a binary file type and a text file type; and
      (iii) setting a second file type tag corresponding to a second file type of said file in substep (i) in said attribute file, wherein said second file type represents one of an executable file type and a nonexecutable file type, wherein the first file type and the second file type are operable for restoring file attribute flags associated with the file in substep (i); and
      (iv) sending said attribute file in said request;
   (d) extracting a file from the software package in response to a request from a second host;
   (e) returning said file in step (d) in a reply to said second host;
   (f) returning said attribute file corresponding to said file in step (d) in said reply;
   (g) returning said data structure in said reply; and
   (h) determining from said package information in said data structure an operating system on said first host;
   (j) if, a current operating system and the operating system in step (h) are different:
      (i) if a first file type tag in said attribute file in step (f) represents a text file type, parsing said file; and
      (ii) replacing a first line feed/carriage return character set with a second line feed/carriage return character set corresponding to the current operating system.

2. A method for creating and managing software packages comprising:
   (a) sending a request for creation of a software package in response to a user command, said request including a data structure for containing package information;
   (b) if said user command includes a file specification:
      (i) sending a file matching said file specification in said request;
      (ii) setting a first file tag corresponding to a first type of said file in step (i) in an attribute file, wherein said first file type represents one of a binary file type and a text file type; and
      (iii) setting a second file type tag corresponding to a second file type of said file in substep (i) in said attribute file, wherein said second file type represents one of an executable file type and a nonexecutable file type, wherein the first file type and the second file type are operable for restoring file attribute flags associated with the file in substep (i); and
      (iv) sending said attribute file in said request;
   (c) shadowing said software package on a second host; and
   (d) inserting said software in a list of shadowed software packages, said list including an identifier associated with said second host and an identifier of said software package.

3. A method for creating and managing software packages comprising:
   (a) sending a request for creation of a software package in response to a user command, said request including a data structure for containing package information;
   (b) if said user command includes a file specification:
      (i) sending a file matching said file specification in said request;
      (ii) setting a first file tag corresponding to a first type of said file in step (i) in an attribute file, wherein said first file type represents one of a binary file type and a text file type; and
      (iii) setting a second file type tag corresponding to a second file type of said file in substep (i) in said attribute file, wherein said second file type represents one of an executable file type and a nonexecutable file type, wherein the first file type and the second file type are operable for restoring file attribute flags associated with the file in substep (i); and (iv) sending said attribute file in said request;
(d) extracting a file from the software package in response to a request from a second host;
(e) returning said file in step (d) in a reply to said second host;
(f) returning said attribute file corresponding to said file in step (d) in said reply;
(g) setting one or more file attribute flags on said second host in response to at least one corresponding file type in said attribute file returned in step (f);
(g) returning said data structure in said reply, wherein said data structure includes package information containing an identifier of a codepage defining a character encoding; and
(h) determining from said package information in said data a codepage for encoding characters for text files in said reply;
(j) if, a current codepage and the codepage in step (h) are different:
 (i) if a first file type tag in said attribute file in step (f) represents a text file type, parsing said file; and
 (ii) translating each character representation from the representation from the codepage in step (h) to the corresponding representation from the current codepage.

* * * * *